United States Patent Office 3,562,261
Patented Feb. 9, 1971

3,562,261
MONO- AND DI-NICOTINATES OF PHOTOSENSITIVE QUATERNARY AMMONIUM COMPOUND AND PRODUCTION THEREOF
Masaru Banno and Shigeo Yasui, Okayama, Okayama Prefecture, Japan, assignors to Eisai Kabushiki Kaisha, Tokyo, Japan
No Drawing. Filed Jan. 22, 1968, Ser. No. 699,324
Int. Cl. C07d 31/36
U.S. Cl. 260—240.1     2 Claims

ABSTRACT OF THE DISCLOSURE

This invention is concerned with novel mono- and di-nicotinates of certain photosensitive quaternary ammonium compounds prepared by reacting the corresponding photosensitive quaternary ammonium halide with nicotinic acid in the presence of silver oxide. The novel nicotinates have an excellent water-solubility and pharmacological and biotical activities with relatively low toxicity and can be used as medicaments as well as active ingredients of various hygienic preparations for external applications.

---

This invention relates to a new class of water-soluble nicotinates of particular photosensitive compounds having pharmacological properties suitable for chemotherapy and for preparation of hygienic cosmetics.

Photosensitive compounds belonging to the group of cyanine and isocyanine dyestuffs in general have long been utilized as photosensitizers in the industry of photography. Compounds such as 1-ethyl-2-[ω-5'-bromo-pyridyl-(2')-aminovinyl]-6-methyl-pyridine-1-iodide having the formula:

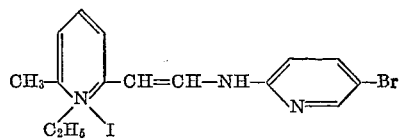

exhibit powerful biotical activity. The remarkable biotical activity presented by application of a minute amount of these compounds has been watched with keen interest and for many years efforts have been directed to utilize these compounds for hygienic and medical purposes. Their considerable low water solubility, however, makes it a decisive fault in the utility of these compounds for the purposes.

It has been surprisingly found according to the present invention that a new class of novel nicotinates of certain photosensitive compounds having an increased solubility in alcohols and particularly in water can be obtained by reacting nicotinic acid with a quaternary ammonium halide of the following general formula:

(I)

wherein R is an alkyl or an allyl group and X is a halogen atom and wherein A is a divalent radical selected from the group consisting of

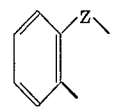

in which Z is S, C or $C(CH_3)_2$;

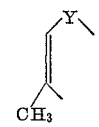

in which Y is S or O; and

in which R' is H or $CH_3$; and wherein B is an atomic grouping directly joined to a carbon atom of the divalent radical A and selected from the group consisting of

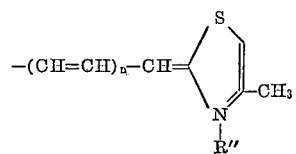

in which R" is alkyl and $n$ equals 0 (zero) or 1,

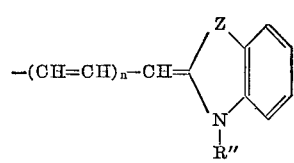

in which R" is alkyl, Z is S or $C(CH_3)_2$ and $n$ equals 0 (zero) or 1,

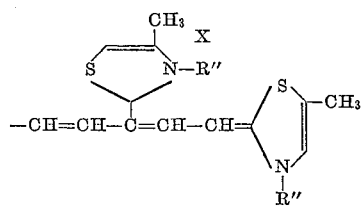

in which R" is alkyl, and X is halogen atom;

—CH:CH—NHR"

in which R″ is 5-halo-2-pyridyl or phenyl group substituted or unsubstituted with alkyl or alkoxy group or halogen atom in which X is a halogen atom and

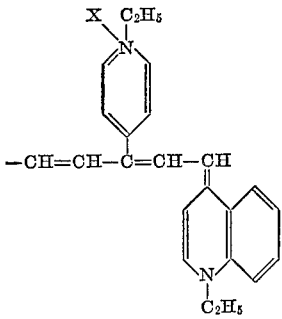

In a preferred embodiment of the process of the present invention, the afore-mentioned novel nicotinates can successfully be prepared by reacting one of the quaternary ammonium halides of the specified photosensitive compounds having the above-mentioned general Formula I with nicotinic acid in a reaction medium such as an aqueous methanol (1:1) and in the presence of freshly prepared silver oxide under vigorous agitation. The silver halide which separates out as the progression of the reaction is removed by filtration from the reaction mixture. The filtrate is evaporated to dryness, the solid reaction product remaining is recovered and purified through recrystallization from ethanol, propanol, isopropanol, acetone and the like.

All of the crystalline nicotinates of the specified photosensitive compounds prepared in accordance with the process of the present invention are new compounds not given in the literature. They are characterized by their marked solubility in alcohol and in particular in water as compared with those of the corresponding quaternary ammonium halide employed as starting material for the preparation thereof. Owing to the fact that the new compounds contain in their molecule the two moieties of nicotinic acid and photosensitive compound, they concurrently exhibit both pharmacological activities of these components. They show remarkable antiallergic, antiedematic and antiseptic activities. They promote metabolism of cellular structure, hair growing and regeneration of skin tissue, wounds and the like.

The new compounds are therefore useful for chemotherapy of certain diseases, such as allergy, edema, pyorrhoea and wounds due to chafing. It has also been found that since they show an excellent complement fixation inhibitor, they are useful for prophylaxis of anaphylaxy and allergy. The new compounds can be employed as active ingredient for the various hygienic cosmetics, such as hair tonic, skin tonic, hair lotion, skin lotion, antidandruff and itch preventing preparations, hair pomades in jelly and fluid forms, salve and the like.

The following examples are illustrative of the synthetic preparation of the novel compounds of this invention:

EXAMPLE 1

Preparation of 1-ethyl-6-methyl[ω-(5'-bromo-2'-pyridylamino)vinyl]pyridine-1-nicotinate 4.46 grs. of 1-ethyl-6-methyl[ω-(5'-bromo-2'-pyridylamino)vinyl]pyridine-1-iodide and silver oxide which has been freshly prepared from 1.8 grs. of silver nitrate and 0.4 gr. of caustic soda are reacted with 1.3 grs. of nicotinic acid in 100 mls. of an aqueous methanol (1:1 by volume) under vigorous stirring for around 30–40 minutes. Silver iodide separated out is removed from the reaction mixture by filtration through a dense filter paper without suction. The filtrate is evaporated under reduced pressure to dryness. The residue is redissolved in a small quantity of ethanol. To the solution thus obtained is added an amount of acetone to crystallize out the product as yellow crystalline mass melting at 181° C. The resulting nicotinate is presented by the following formula:

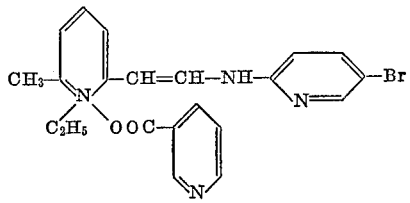

EXAMPLE 2

Preparation of 3,3'-diethyl-2,2'-monomethin-benzothiazolo cyanine-3-nicotinate 4.7 grs. of 3,3'-diethyl-2,2'-monomethin-benzothiazolo cyanine-3-iodide and silver oxide freshly prepared from 1.8 grs. of silver nitrate and 0.4 gr. of caustic soda are reacted with 1.3 grs. of nicotinic acid in 100 mls. of an aqueous methanol (1:1 by volume) under vigorous agitation for around 30–40 minutes. Silver iodide precipitated out on the completion of the reaction is removed from the reaction mixture by filtration through a dense filter paper without suction. The filtrate is evaporated on the water bath to dryness. The residue is recrystallized from ethanol. There is obtained yellow crystalline powder melting at 243°–4° C. The product has the following formula:

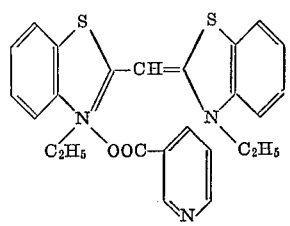

EXAMPLE 3

Preparation of 3,3',3″-tri-n-heptyl-4,4',4″-trimethyl-2,2'-pentamethin - γ - (2″)-thiazolyl-thiazolocyanine-3,3″-dinicotinate 4.5 grs. of 3,3',3″ - tri-n-heptyl-4,4',4″-trimethyl-2,2'-pentamethin - γ-(2″)-thiazolyl - thiazolocyanine-3,3″-diiodide and silver oxide which has freshly been prepared from 3.6 grs. of silver nitrate and 0.8 gr. of caustic soda are reacted with 2.6 grs. of nicotinic acid in 150 mls. of an aqueous methanol (1:1 by volume) under vigorous agitation for around 30–40 minutes. Silver iodide which separates out as the progression of the reaction is removed from the reaction mixture by filtration through a dense filter paper under ambient pressure. The filtrate is evaporated under reduced pressure to dryness. The residue is purified from 15 cc. of acetone. There is thus obtained pure dinicotinate in a greenish crystalline powder melting at 80°–85° C. The yield amounts to 4.2 grs. The product has the formula:

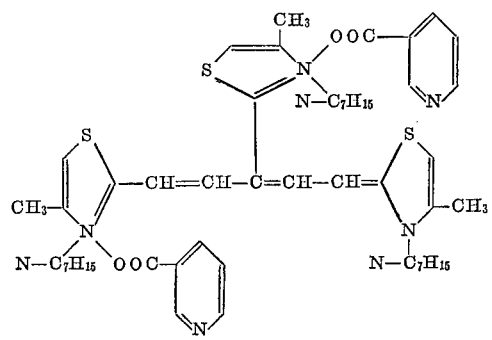

In the analogous manner as disclosed in the preceding examples, there are obtained the mono- and dinicotinates listed in the following table starting from the corresponding quaternary ammonium halides and nicotinic acid.

TABLE

| | Products with formulae | Appearances | Melting points, °C. |
|---|---|---|---|
| Examples: | | | |
| 4 | 3,3'-di-n-heptyl-4,4'-dimethyl-2,2'-monomethinthiazolocyanine-3-nicotinate. | Yellow leaflets | 132 |
| 5 | 3,3'-diethyl-4,4'-dimethyl-2,2'-trimethin-thiazolocyanine-3-nicotinate | Purple-blue needles | 193–4 |
| 6 | 1,1',3,3,3',3'-hexamethyl-2,2'-trimethin-indocyanine-1-nicotinate | Red-purple, metallic rustered crystal | 166 |
| 7 | 3,3',3'',4,4',4''-Hexamethyl-2,2'-pentamethin-γ-thiazolyl-(2'')-thiazolocyanine-3,3''-dinicotinate. | Blue crystal | 148 |
| 8 | 1,1',1''-triethyl-γ-quinolyl-(4'')-4,4'-pentamethin-quinocyanine-1,1''-dinicotinate. | Gold-yellow crystal | 228 |

TABLE—Continued

| | Products with formulae | Appearances | Melting points, °C. |
|---|---|---|---|
| 9 | 1-iso-pentyl-6-methyl-2-[ω-(5'-bromo-2'-pyridylamino)-vinyl]-pyridine-1-nicotinate. | Yellowish brown powder | 170–1 |
| 10 | 3,4-dimethyl-2-(ω-anilino)-vinyl-oxazole-3-nicotinate | Pale yellow powder | 184–5 |
| 11 | 1-ethyl-6-methyl-2-(ω-anilino)vinyl-pyridine-1-nicotinate | Yellow powder | 170 |
| 12 | 3-ethyl-4-methyl-2-[ω-(p-tolylamino)vinyl]-thiazole-3-nicotinate | Yellow leaflets | 183–183.5 |
| 13 | 1-ethyl-2-(ω-anilinovinyl)-pyridine-1-nicotinate | Yellow powder | 152–3 |
| 14 | 3-ethyl-4-methyl-2-(ω-anilinovinyl)-thiazole-3-nicotinate | Pale yellow powder | 157–8 |
| 15 | 3-ethyl-4-methyl-2-(ω-p-methoxyphenylamino)-thiazole-3-nicotinate | Orange yellow crystal | 163–5 |

TABLE—Continued

| | Products with formulae | Appearances | Melting points, °C. |
|---|---|---|---|
| 16 | 3-n-heptyl-4-methyl-2-(ω-anilinovinyl)-thiazole-3-nicotinate | Yellow leaflet crystal | 138–9 |
| 17 | 3-ethyl-4-methyl-2-[ω-(5'-bromo-2'-pyridylamino)-vinyl]-thiazole-3-nicotinate. | Yellow crystal | 154–5 |
| 18 | 3-ethyl-4-methyl-2-[ω-(p-chlorophenylamino)-vinyl]-thiazole-3-nicotinate. | Yellow leaflet crystal | 185–6 |
| 19 | 3-ethyl-4-methyl-[ω-(5'-chloro-2'-pyridylamino)-vinyl]-thiazole-3-nicotinate. | Yellow powder | 142–3 |
| 20 | 3-allyl-4-methyl-2'-[ω-(o-tolylamino)vinyl]-thiazole-3-nicotinate | Yellow powder | 110–11 |

The excellent solubility in alcohols and in particular in water of the nicotinates according to the present invention will be seen from the data given in the following table which has been obtained in comparison tests carried out with some typical products and the corresponding iodides. The figures of the data show the numbers of ml. of the solvents required for complete dissolution of one gram of the samples under test:

TABLE

| | Product of Example 1 [1] | Corresponding iodide | Product of Example 3 [2] | Corresponding iodide | Product of Example 4 [3] | Corresponding iodide | Product of Example 10 [4] | Corresponding iodide |
|---|---|---|---|---|---|---|---|---|
| Solvent: | | | | | | | | |
| Water | 1 | 2,850 | 1 | 2,850 | 110 | 200,000 | 50 | 260 |
| Ethanol | 2 | 1,200 | 2 | 1,200 | 20 | 2,800 | 9 | 200 |
| Propylenglycol | 2 | 200 | 3 | 200 | 10 | 200 | 30 | 100 |

[1] 1-ethyl-6-methyl-[ω-(5'-bromo-2'-pyridylamino)-vinyl]-pyridine-1-nicotinate.
[2] 3,3',3''-tri-n-heptyl-4,4',4''-trimethyl-2,2'-pentamethin-γ-thiazolyl-thiazolocyanin-3,3''-di-nicotinate.
[3] 3,3'-di-n-heptyl-4,4'-dimethyl-2,2'-monomethin-thiazolocyanin-3-nicotinate.
[4] 3,4-dimethyl-2-(ω-anilino)-vinyl-oxazole-3-nicotinate.

Acute toxicity of the typical nicotinates obtained by Example 1, that is, 1-ethyl-6-methyl-[ω-(5'-bromo-2'-pyridylamino)vinyl]pyridine-1-nicotinate was observed by intravenous and per os administrations to healthy dd strain adult mice weighing 18–20 grs. The results observed at the 6 hours' lapse of the administration are:

Intravenous injection: mg./kg.
$LD_{50}$ _____ 40.4
Per os administration:
$LD_{50}$ _____ 1195

The animals died immediately after the intravenous injection. On the other hand, strong sedative effect was observed in 30 minutes lapse of the per os administration. With larger dose, the sedative effect continued for 24 hours or more. In some cases, chronic extension was also observed.

Anti-edematic effect of the above nicotinate was measured on edema caused by subcutaneous injection of 0.05 ml. of 1% aqueous carrageenin solution to palm of a hind leg of male wister strain rats weighing 150–170 grs. After one hour's lapse of the injection, the nicotinate was administered per os in the amounts as shown hereinunder table and the volumes of the edema was measured by means of the string gauge in each time of 2, 3 and 4 hours' lapse of the carrageenin injection. The results are tabulated in table in which the anti-edematic effect (percent) shows the value obtained by dividing the figure of intensity of edema with the figure of the intensity of edema in control and multiplying the quotient by 100:

TABLE

| | Time after edema induction, hours | Intensity of edema | Anti-adematic effect percent |
|---|---|---|---|
| Treatment: | | | |
| Control | 2 | .544±.073 | |
| Do | 3 | .678±.089 | |
| Do | 4 | .678±.076 | |
| 100 mg./kg | 2 | .324±.302 | [1] 40 |
| 100 mg./kg | 3 | .492±.307 | [1] 27 |
| 100 mg./kg | 4 | .470±.277 | [1] 31 |
| 200 mg./kg | 2 | .364±.142 | [1] 33 |
| 200 mg./kg | 3 | .508±.196 | [1] 25 |
| 200 mg./kg | 4 | .538±.193 | [1] 21 |

[1] Exhibited significant difference from the control in P=0.05.

A notable anti-edematic effect will be seen from table.

A significant inhibitory effect on passive cutaneous anaphylaxis (P.C.A.) exhibited by the same nicotinate compound was observed in guinea pig test. The skin dyes of the guinea pigs completely disappeared when 300–400γ of the compound were administered. It was found that more pronounced inhibitory effect is observed when the administration was effected concurrently with P.C.A. induction. Optimum effect was obtained by administration in 60 minutes prior to the P.S.A. induction.

Following hygienic preparations are given as referential examples in which the novel nicotinates of the present invention are incorporated as active ingredients, parts being by weight.

(A) Lotion Parts
Lanolin _____ 1.0
Propylenglycol monostearate _____ 4.0
Higher fatty acid ester of cholesterol _____ 7.0
Methyl oxybenzoate _____ 0.1
Propylenglycol _____ 3.0
Water _____ 85
3,4-dimethyl-2-(ω-anilino)vinyl-oxazole - 3 - nicotinate (product of Example 10) _____ 0.01
Perfume, q.s.

The ingredients are well mixed to form a homogeneous liquid.

(B) Cream
Parts
Glycerol monostearate _____ 10.0
Vaseline _____ 10.0
Liquid paraffin _____ 10.0
Lanolin _____ 25.0
White bees-wax _____ 5.0
Methyl p-oxybenzoate _____ 0.15
Propyl p-oxybenzoate _____ 0.15
Water _____ 39.0
Perfume, q.s.
1 - ethyl - 6 - methyl - [ω - (5' - bromo - 2' - pyridylamino)-vinyl]pyridine-1-nicotinate, (product of Example 1) _____ 0.001

The ingredients are well mixed under mild heat to form cream.

(C) Hair tonic
Parts
Menthol _____ 1.4
Resorcinol _____ 0.5
Diethylstilbestrol _____ 0.001
Ethanol _____ 80
Water _____ 17
Glycerol _____ 1
3,3' - di - n - heptyl - 4,4' - dimethyl - 2,2' - monomethinthiazolocyanin-3-nicotinate (product of Example 4) _____ 0.001
Perfume, q.s.

The ingredients are well mixed to form a homogeneous liquid.

What we claim is:
1. 1 - ethyl - 6 - methyl - [ω - (5' - bromo - 2' - pyridylamino)-vinyl]-pyridine-1-nicotinate.
2. 3,3',3'' - tri-n-heptyl - 4,4',4''-trimethyl - 2,2' - pentamethin - γ - thiazolyl - thiazolocyanin - 3,3' - dinicotinate.

References Cited

UNITED STATES PATENTS 3,148,187  9/1964  Heseltine _____ 260—240.4

OTHER REFERENCES

Chemical Abstracts I, vol. 44, col. 1502 (1944) (abstract of Calo).

Chemical Abstracts II, vol. 48, col. 170 (1954) (abstract of Ogata et al.) (1956).

Chemical Abstracts III, vol. 50, col. 1003 to 1005 (abstract of Takahashi et al.).

Chemical Abstracts IV, vol. 50, cols. 2576 to 2577 (1956) (abstract of Gautier et al.).

JOHN D. RANDOLPH, Primary Examiner

U.S. Cl. X.R.

260—240.8; 424—263, 266